United States Patent Office 3,214,191
Patented Oct. 26, 1965

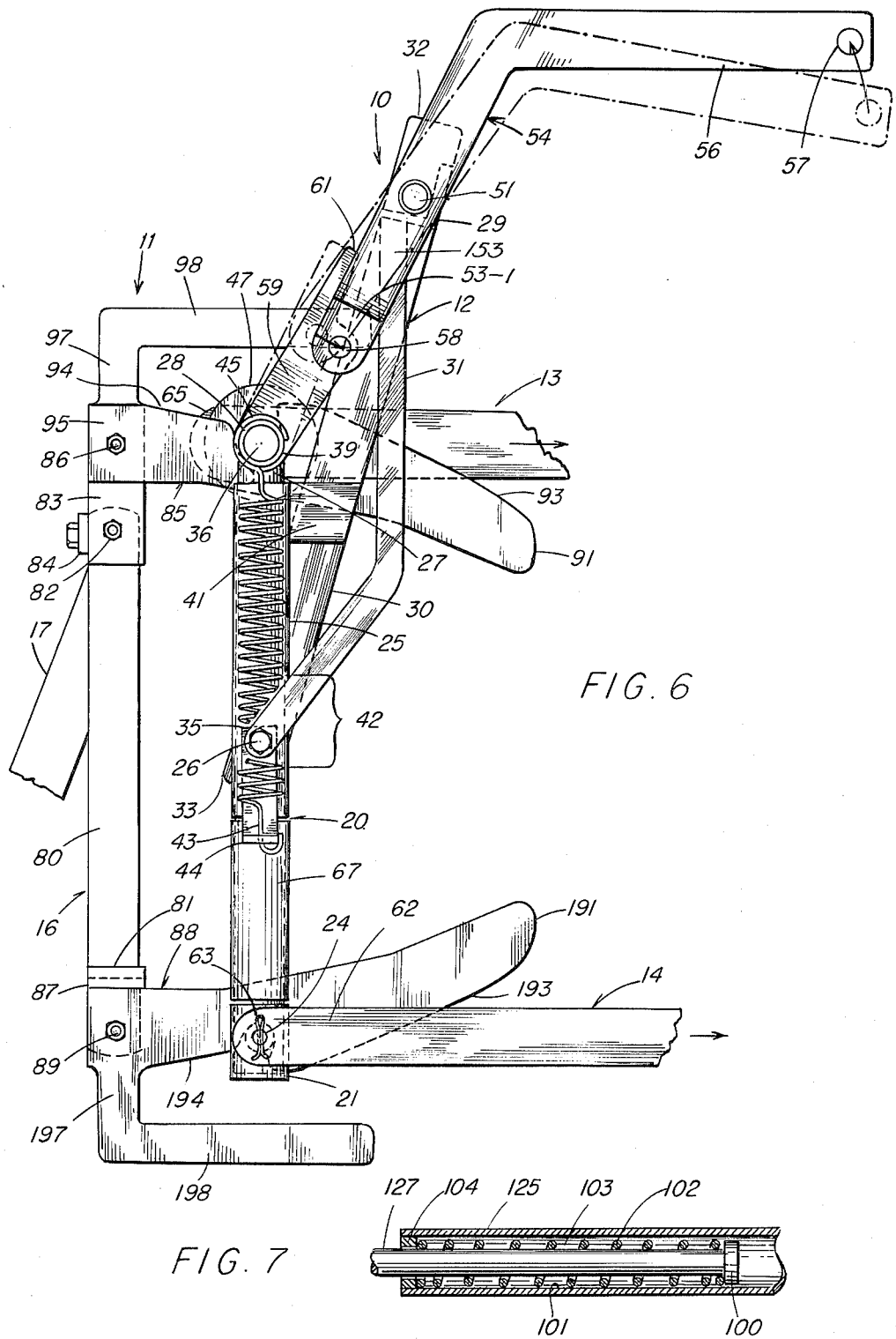

3,214,191
TRACTOR IMPLEMENT CONNECTION
FACILITATING HITCH
Isaac Y. Johnson, 108 W. Canal St., Aberdeen, Miss.
Filed Sept. 23, 1963, Ser. No. 310,591
15 Claims. (Cl. 280—479)

The present invention relates generally to hitches for disconnectably attaching implements or working tools to tractors and, more particularly, to such hitch apparatus which includes a tool-supporting sub-assembly attachable to a three-point suspension type of tractor hitch linkage and a complementary working-tool connector sub-assembly attachable to a working tool or implement, such apparatus being of the general type illustrated in the Hess Patent No. 2,979,137 of April 11, 1961.

Prior of the present invention many structural variations of such hitch apparatus have been proposed but their production and use have involved many problems. Many are costly and excessively time consuming to produce, assemble and mount. Many are bulky, heavy and difficult to employ. Some require connecting or attachment procedure necessitating the tractor operator to dismount from the tractor seat. Some make it difficult to secure connection or attachment of the working tool or implement to the tractor hitch linkage by backing the tractor thereto if the implement and tractor are not both located on relatively level ground, or their horizontal axes, front to back, are not substantially aligned or oriented relative to each other similar to the relative disposition thereof when the implement is hitched to the tractor for drag or work operation. It is a general object of the present invention to provide the hitch apparatus of the present invention in a form which efficiently solves or eliminates these prior art problems.

The tractor hitch apparatus of the present invention includes the combination of a working tool-supporting sub-assembly, attachable to a conventional or similar three-point suspension type of tractor hitch linkage, and a complementary working-tool connector sub-assembly, which is attachable to a working tool, and automatically connectable readily to the former sub-assembly and easily disconnected therefrom. One of these complementary sub-assemblies embodies a frame which includes a pair of transversely-spaced, upright, self-adjusting post means. Each post means has upper and lower sections, which are slidably connected together for alternate relative foreshortening and lengthening longitudinal movement and, for this purpose, may comprise a pair of elongated members telescoped together, one within the other, such as a rod slidably mounted within a cylindrical sleeve. This frame is also equipped with means which biases the upper and lower sections of each of these self-adjusting post means longitudinally relative to each other, so as to tend to effect relative change in the effective length of each of the post means. Such biasing means may be in the form of spring members embodied within each of the self-adjusting post means or attached to structure connected to the upper and lower sections thereof. The other complementary sub-assembly comprises another upright frame attachable to the front end of a working tool or implement and which is detachably connected to the complementary frame that embodies the self-adjusting post means described above.

These complementary frames are provided with complementary and opposed, interengaged automatically connectable means. One of these interengaged connectable means comprises hook means or elements mounted on and projecting from upper and lower portions of one of the pair of complementary frames toward the other frame. The other complementary interengaged connectable means comprises transversely-extending hook-anchoring means mounted on upper and lower portions of the other complementary frame, and may be in the form of elongated transverse bars or shafts which may be advantageously equipped with freely rotatable rollers or sleeves. The automatically connectable means which is mounted upon the frame in which is embodied the self-adjusting post means are carried by the upper and lower sections of the latter for relative vertical motion in one direction due to the biasing and in the opposite direction by engagement of the complementary automatically connectable means in opposition to this biasing, so that when the frames are pushed together in opposed relation the hook means are automatically snapped about the hook-anchoring means.

Such resilient biasing means assures that the automatically conectable means carried by the self-adjusting post means of one frame will permit automatic adjustment thereof relative to the complementary automatically connectable means of the other frame when brought together so as to assure their secure connection for rigid anchorage of the working tool or implement to the tractor. When the tractor operator has the tractor only generally aligned with the front end of the implement and backs the former up to the latter, even though there be considerable misalignment of the horizontal axes, front to back, of the tractor and implement or one is tilted laterally to an appreciable degree relative to the other because of unevenness of the ground surfaces on which they are supported, all of the necessary operations for effecting the quick automatic attachment or connection, which are few in number, may be easily accomplished by the tractor operator as he sits on the tractor seat.

There is also embodied in preferred forms of the tractor hitch apparatus of the present invention manually operable means which are located conveniently to the operator as he sits on the tractor seat for ready manipulation by him to disengage the hook means of one of the frames from the hook-anchoring means of the other frame for detaching one frame from the other to unhitch the implement or working tool. This manually operable means, which is so conveniently located for operation by the operator of the tractor as he rides on the seat of the latter, may be in the form of a hand lever pivotally mounted on the frame supported by the three-point suspension type of tractor hitch linkage, and this frame is hereinafter identified as the "tractor hitch frame." The complementary frame is hereinafter identified as the "working tool hitch frame" or "implement hitch frame."

There may also be provided on this tractor hitch frame a freeable locked latching means which temporarily prevents relative longitudinal motion of the upper and lower sections of the self-adjusting post means until such time as the latching means is freed, so as to assure dependable rigid attachment of the pair of frames together. While such latching means may be in a variety of forms it is an object of the present invention to combine it with the hand lever so that when the latter is manipulated it will automatically free the latching means.

The latching means may be a pivoted element or dog having a nose which by force of gravity falls to engagement over abutment means on one of the self-adjusting post sections with the lever pivoted to structure carried by or connected to the companion post section that has relatively longitudinal movement in an upward direction relative to the former when the latching means is disabled or freed. Manipulation of the lever in a manner to adjust the relative longitudinal positions of these sections of the post means may cause such latching means first to be moved to such disabled or freed position. In accordance with the preferred embodiment of the present invention such latching means may be combined with a portion of the hand lever to provide at least one over-center toggle brace. This toggle brace may include as one element thereof a pull link which is pivotally mounted at a point to the lever, so as to form at this point of pivotal connection a toggle brace knee. The pull link is also pivotally connected to the upper post means section at another point longitudinally spaced from the former, so that this link connects the lever to this post section. This overcenter toggle brace has associated therewith locking means which limits swing of its knee through a line extending between the lever fulcrum point and pivotal connection of the link with the upper post means section to a locking point beyond this line. Thus, when force is manually applied to the lever to swing it, such over-center toggle brace is swung out to an extended disposition from its locked position, with the pull link then serving merely as a connection between the lever and the upper post means section to apply force to the latter for moving it longitudinally relative to the companion post means section.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a perspective view, with parts broken away and in section, of an embodiment of the tractor hitch apparatus of the present invention, and showing in phantom rear parts of a tractor to which one frame of the hitch is connected by a conventional three-point suspension type of tractor hitch linkage, with the complementary hitch frame being shown supported by suitable structure that may be mounted upon a working tool or implement, the complementary frames being shown connected together for draft of the latter by the tractor;

Figure 2:
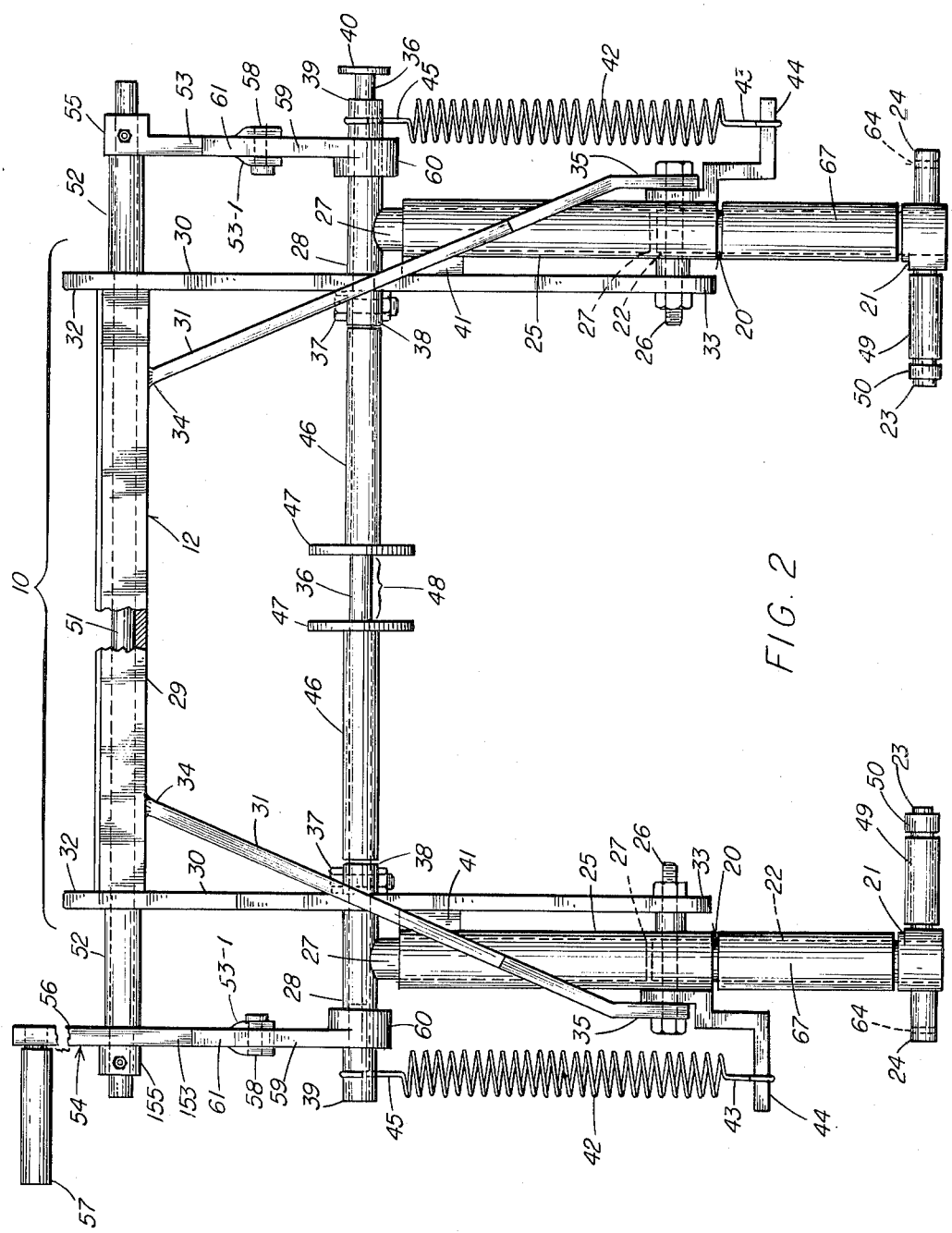
FIG. 2 is an elevational view, to larger scale, with parts broken away and in section, of the hitch frame which in FIG. 1 is shown carried by the three-point suspension type of tractor hitch linkage, and as viewed from the tractor side of front thereof.
Figure 3:
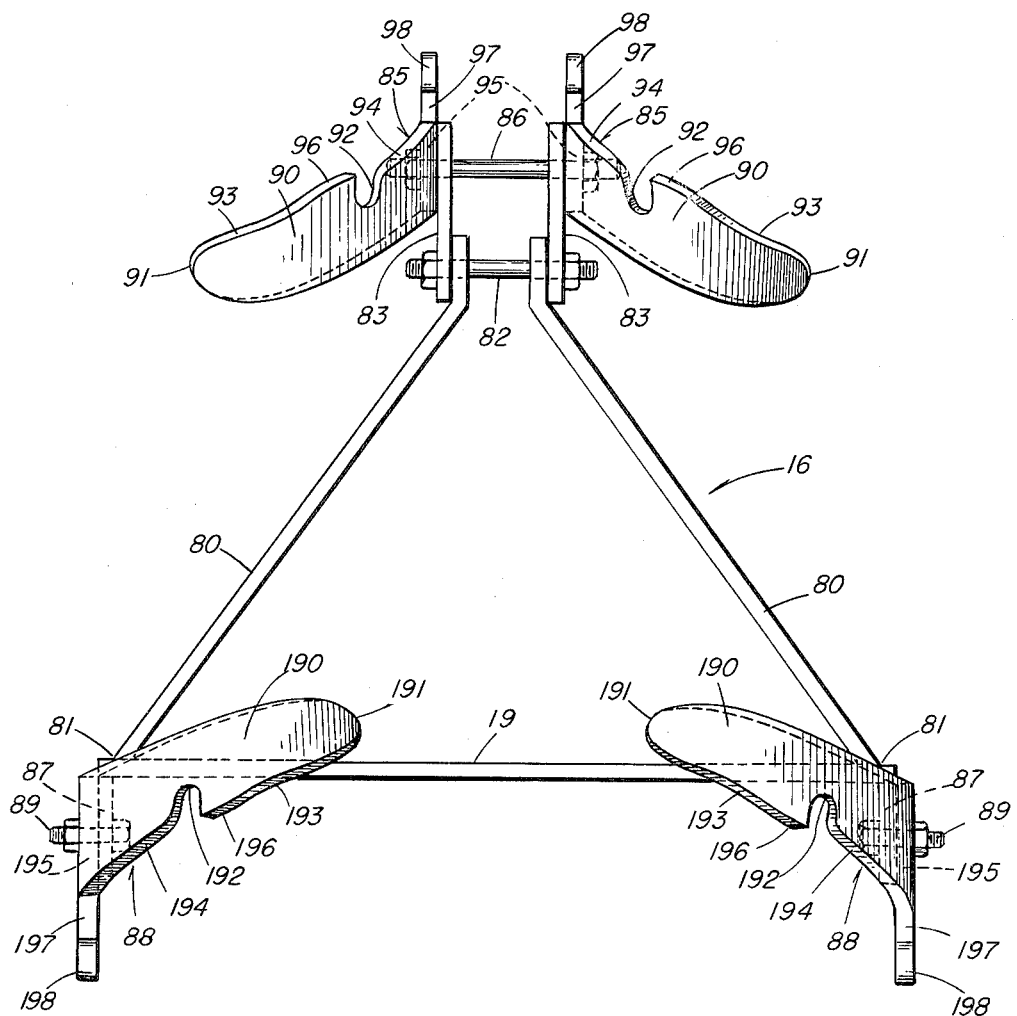
FIG. 3 is an elevational view to a scale larger than that of FIG. 2 of the complementary frame which is attachable in a rigid manner to the front end of the implement or working tool.
Figure 4:
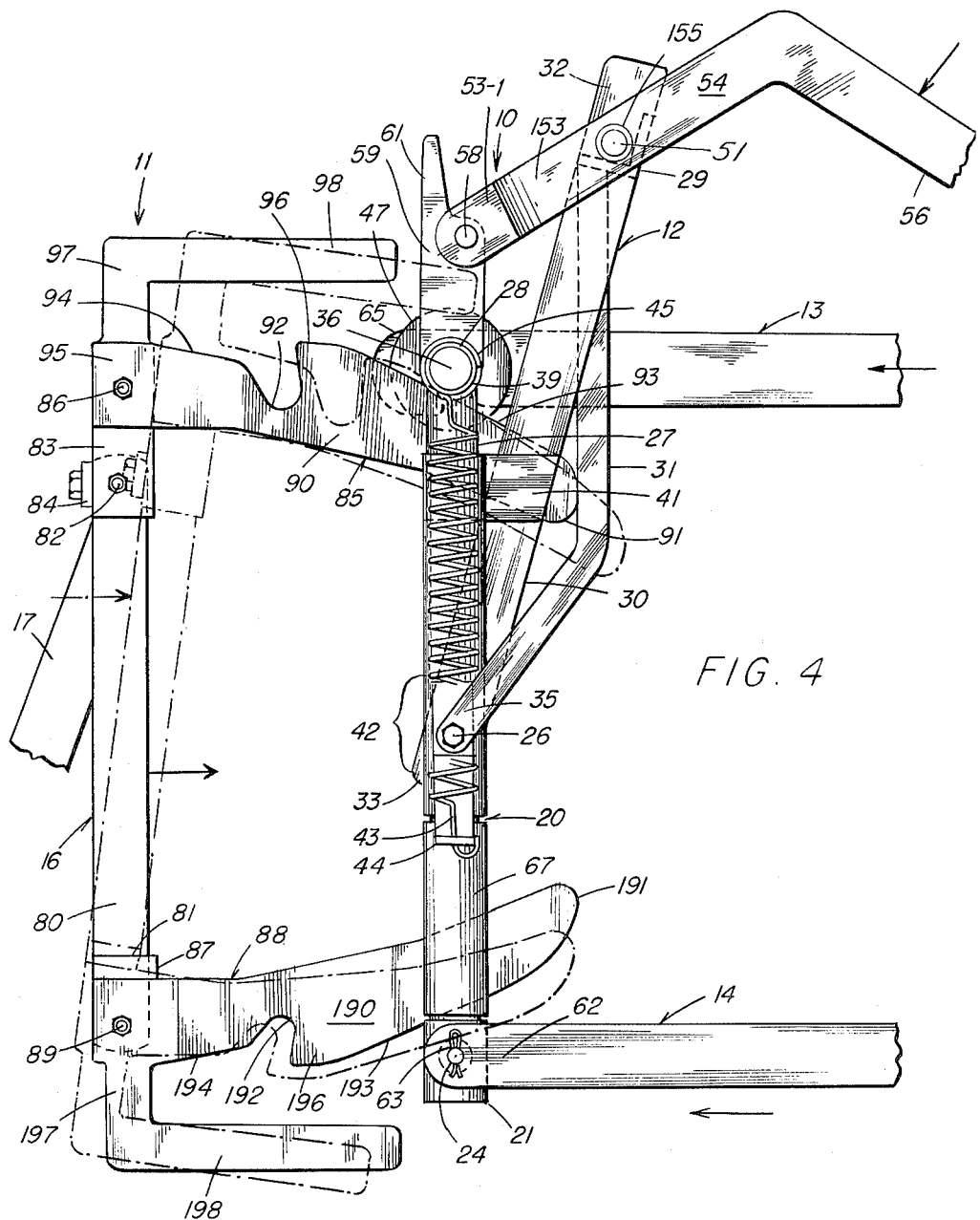
Figure 5:
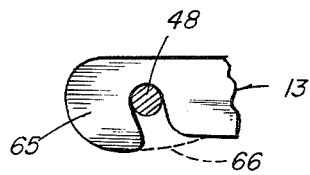

FIG. 4 is a side elevational view, to substantially the same enlarged scale of FIG. 3, of the pair of complementary frames shown in FIGS. 2 and 3, with one of the frames being shown supported by the tractor hitch linkage, and illustrating in dot-dash lines an initial position of the companion frame supported on the front end of the working tool or implement and in full lines the automatic reorientation of the latter as the tractor is backed up for automatic attachment of the hitch frames together;

FIG. 5 is a detail, with parts broken away and in section, of the terminal end of a draft control bar shown in FIG. 4, and illustrating attachment thereof to the tractor hitch frame;

FIG. 6 is a side elevational view, with parts broken away, similar to FIG. 4, showing in full lines the relative positions of the members of the pair of hitch frames as they are automatically connected or locked together, and indicating in dot-dash lines the relative positions of the manual hand level and its associated pull link which together form the over-center toggle brace before the knee of the latter is swung to the locked position; and FIG. 7 is a sectional view of a modified form of the upper and lower sections of one of the self-adjusting posts of the tractor hitch frame.

Figure 1:
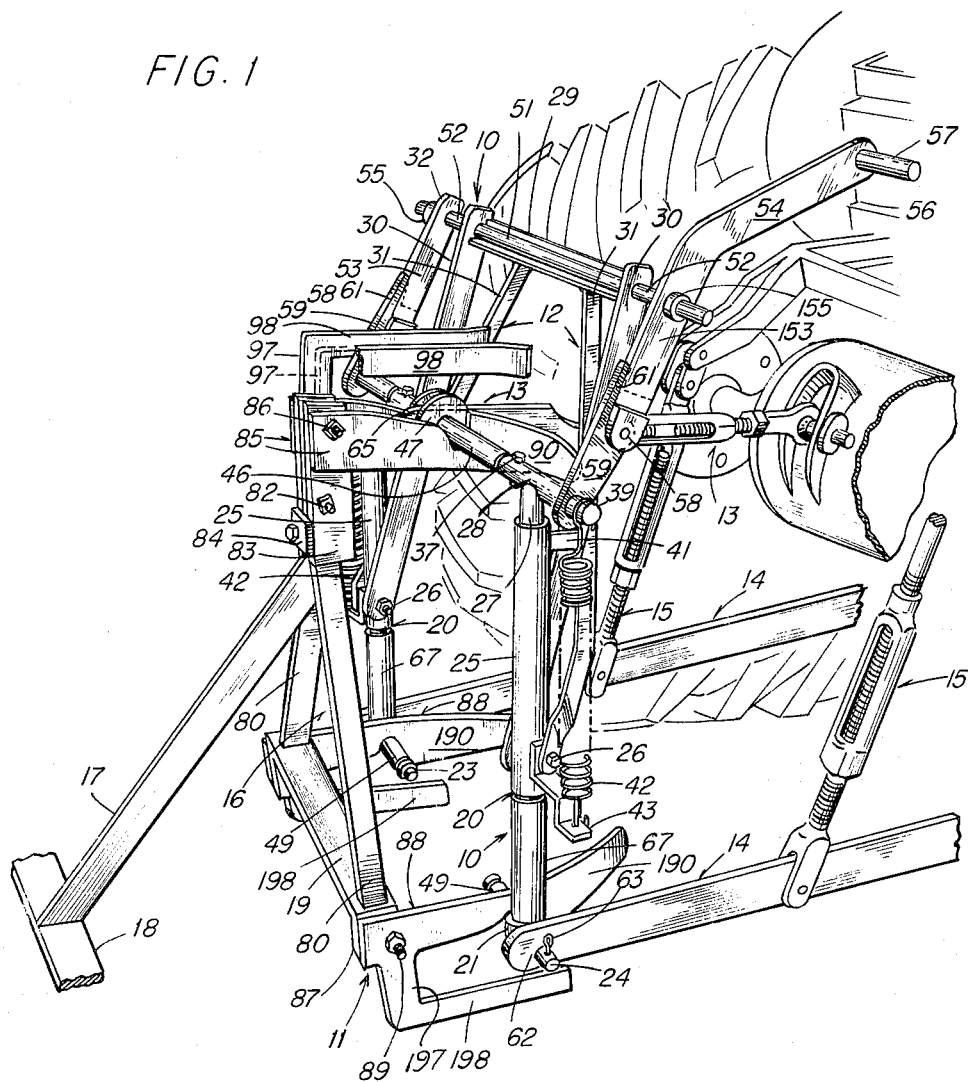

Referring to the drawings, in which like numerals identify similar parts throughout, and more particularly to FIG. 1 thereof, it will be seen that the embodiment of the tractor hitch apparatus, illustrating in FIGS. 1 to 6 inclusive, includes a working tool-supporting sub-assembly 10 and a complementary working-tool connector sub-assembly 11 connected or locked thereto. The working tool-supporting sub-assembly 10 is shown as embodying an upright tractor hitch frame 12 which is demountably attached to a draft control bar 13 and a pair of draw bars 14 suspended from hydraulic lift links 15 in conventional manner. The working-tool connector sub-assembly includes a complementary upright implement frame 16 which is attached to a working tool or implement, such as by means of a draft tongue angle bar 17 suitably fastened or welded to a transverse member 18 which may be rigidly mounted on the implement, and the latter preferably will be connected in any suitable manner also to a tranverse frame member 19 of this implement frame by any suitable means.

As will be seen from FIGS. 1, 4 and 6, and more particularly in FIG. 2, the tractor hitch frame 10 includes in its assembly 12 of frame members a pair of transversely-spaced, upright, self-adjusting posts 20. Each post 20 includes an inverted T-head 21 having a cylindrical upright shaft element 22 carrying on its lower end transversely-extending pins 23 and 24 extending in substantial alignment from opposite sides thereof. The top end of the shaft 22 of each T-head 21 is socketed within the lower end of a cylindrical sleeve or tube 25, and a transverse bolt 26 extends through both of them to lock them together, so that they cooperatively form a lower section of one of the upright posts 20.

Within the top end of each sleeve or tube 25 is telescoped for free up and down action an elongated rod or piston 27. The top end of each rod or piston 27 has fixed thereto, such as by welding, a transverse T-head sleeve 28, with the resulting pair of laterally-extending T-head sleeves 28 being coaxially alinged. Each T-head sleeve 28 and the rod or piston 27 on which it is supported constitutes the upper section of one of the upright posts 20.

The top end of the frame assembly 12 is defined by a transverse bar 29, which may be in the form of an elongated angle member, a tubular sleeve, or the like. The transverse frame member 29 is fixedly mounted in a suitable manner to the lower sections of the pair of upright posts 20, such as by means of two pairs of bracket arms 30 and 31. The top ends 32 of bracket arms 30 are suitably fixed to the transverse frame member 29, such as by welding, and with their lower ends 33 respectively connected or fastened to one of the paired sleeves 25 and upright shaft 22 by the through bolt 26. The upper ends 34 of bracket arms 31 are also fixedly mounted to the transverse frame member 29, such as by welding, and have their lower ends 35 likewise anchored to the lower sections of the upright posts 20 by through bolts 26. As will be seen from FIG. 2 the lower ends 33 of the bracket arms 30 and those at 35 of the bracket arms 31 are preferably located on opposite sides of the lower ends of the tubular sleeves 25 to attain the angular disposition between the paired bracket arms illustrated in FIG. 2, for attaining maximum rigidity of the frame assembly 12.

The upper sections of the pair of self-adjusting upright posts 20, each consisting of one of the pair of rods 27 slidably telescoped within one of the sleeves 25 and the T-head sleeve 28 carried by this rod, are securely tied together by a transverse shaft 36 slidably mounted into the aligned T-head sleeves 28, and fixedly anchored temporarily therein by removable bolts 37. Each bolt 37 extends through aligned holes in the transverse shaft 36 and the inner end 38 of one of the T-head sleeves 28, as will be seen in FIG. 2. Such bolts make it possible to remove the shaft 36 from the sleeves 28, and this is desirable so as to facilitate mount of guide rollers (hereinafter described) upon this shaft, as well as draft control bar structure when the latter is not provided with an engaging catch-equipped hook. For the purpose of facilitating removal of the transverse shaft 36 one end thereof may project from out of the outer end 39 of one of the T-head sleeves 28, and its projecting end may be equipped with a readily-engageable hand hold or pull knob 40, as is illustrated in FIG. 2.

In order to assure that the pair of transversely-spaced self-adjusting upright posts 20 will constitute rigid parts of the tractor hitch frame structure 12, and to prevent pivoting about bolts 26 the upper ends of the sleeves 25 are fixedly tied to the brackets 30, e.g., by straps 41 fixedly anchored thereto, such as by welding. Consequently, the top cross bar 29, bracket arms 30 and 31, the lower sections of the upright posts 20 comprising sleeve 25 and the depending T-heads 21 with their suspending rods or shafts 22 together constitute an assembly of frame members 12 rigidly tied together.

The upper sections of the upright posts 20, defined by the slidable depending rods 27 and the T-head sleeves 28 carried thereby, together with the transverse shaft 36, which tie these upper sections together, are suitably biased downwardly to initial lower positions, such as by tension springs 42, as will be best seen from FIG. 2. This sub-assembly of the upper sections of the upright posts may be lifted or forced upwardly against the downward biasing of springs 42, and the latter are suitably connected for this service by having their lower ends 43 fastened to brackets 44 mounted on bolts 26 and with their upper ends 45 hooked up over the projecting outer ends 39 of the T-head sleeves 28.

As will be more fully explained later the attaching means which detachably connects the implement hitch frame 11 to the tractor hitch frame 10 is provided in the embodiment, illustrated in FIGS. 1 to 6 inclusive, with hook means for engaging hook-anchoring means or members of the frame assembly 12 which constitutes a portion of the tractor hitch frame. The transversely-aligned pins 23 of the T-heads 21 and the transverse shaft 36 may serve this purpose. In order to facilitate easy ride of such hook means over these transversely-extending hook-anchoring elements they are preferably equipped with rollers. As will be seen from FIG. 2 the transverse shaft 36 is provided with a pair of rollers 46 freely mounted thereon for rotation thereabout between the inner ends 38 of the T-head sleeves 28. The opposed inner ends of the rollers 46 preferably are provided with transverse flanges 47 to define therebetween an exposed section 48 of the transverse shaft 36 for anchoring engagement by the draft control bar 13. The transverse pins 23 carry a pair of rollers 49 which are freely rotatable thereon and are suitably held in position by collars 50 anchored to the ends of the pins 23 by set screws or other suitable means.

In order to provide mechanism for lifting the upper sections of the upright posts 20 from the location of the operator's seat the top end of the rigid sub-assembly 12 of frame members is provided with a transverse shaft 51 extending through holes in the upper ends 32 of the bracket arms 30 and nested in the angle 29. Outward of the bracket arms 30 the ends of the cross shaft 51 carry spacer sleeves 52 against which are respectively abutted a crank arm 53 and inner end 153 of a hand lever 54 of the first class. Hubs 55 and 155, respectively fixed to the crank arm 53 and the lever 54, are fixedly mounted upon the ends of the cross shaft 51 beyond the spacer sleeves 52, by any suitable means, such as set screws, through bolts or the like. Thus the cross shaft 51 defines the fulcrum point of the hand lever 54 and is rotatable therewith to swing the crank arm 53 with the lower or inner end 153 of the lever. The other free end 56 of the lever extends forward and carries in the vicinity of the operator's seat on the tractor a hand-engageable handle 57 for depressing it, as will be seen from FIGS. 1, 2 and 6. The bottom ends of crank arm 53 and of the inner end 153 of the hand lever 54 are bifurcated to provide clevises or forks 53–1 that have pivotally connected thereto at 58 top ends of pull links 59, and with the bottom ends of these pull links provided with hubs 60 through which are extended, for free rotation therein, the outer ends 39 of the T-heads 28 embodied in the upper sections of the upright posts 20. Thus, when the front end 56 of the lever 54 is depressed by its handle 57 the crank arm 53 and the bottom end 153 of the lever will be swung up to cause pull links 59 to lift the T-heads 28 and their depending rods 27 (which are telescopically mounted in sleeves 25) up against the downward biasing provided by the tension springs 42.

It is desirable to provide such lifting mechanism with suitable latching means, so that after an implement hitch frame 11 has been attached to the tractor hitch frame 10 there will be no tendency for the working operation of the implement as it is drafted or dragged by the tractor over rough terrain undesirably to disconnect through jouncing. In the embodiments illustrated in the drawings, such latch means is provided in the form of an over-center toggle brace structure preferably embodied as a pair thereof. On one side such over-center toggle brace consists of crank arm 53, one of the pull links 59 pivotally connected thereto at 58, and on the other side by the lower end 153 of the lever 54 which is in similar manner pivotally connected at 58 to the other pull link 59. Thus, each of these over-center toggle braces has a knee at the pivot 58 and it includes suitable locking stop means, such as lug or finger 61 fixed to and extending forward from the upper end of the pull link 50 above the pivot 58 and beyond the associated clevis 53–1 to rest in alignment over the back edge of the crank arm 53 or lever lower end 153, as the case may be. As will be seen from FIGS. 1, 4 and 6, the locking stop finger 61 of each over-center toggle brace is brought to engagement of the back edge of crank arm 53 or the lower lever end 153 at the knee to limit forward swing of the latter through a line extending between the pivot point or lever fulcrum point defined by cross shaft 51 and the pivotal connection of the pull link 59 of this toggle brace with the T-head sleeve 28 of the upper post section. Such locked positions of the over-center toggle braces is illustrated in full lines in FIGS. 1 and 6, and it will be seen from FIGS. 4 and 6 that when the front end 56 of the lever 54 is depressed the knee at 58 of each over-center toggle brace will be swung back and lifted out from its locked position, then to be swung upwardly for applying pull to the pull link 59 thereof for lift of the T-head sleeve 28, as will be explained more fully later.

It will be understood from FIGS. 1, 4 and 6 that the outer ends 62 of the draw bars 14 may be connected to the lower portions of the sub-assembly of frame members 12 by engaging lateral pins 24 of T-heads 21 through holes in these draw bar ends and suitably securing the parts together, such as by split or cotter pins 63 inserted in holes 64 (see FIG. 2) extending transversely through the pins 24, as it illustrated in FIGS. 1, 4 and 6. If greater rigidity of the sub-assembly of frame members 12 is desired, particularly in the lower portion thereof, the opposed pins 23 of T-heads 21, as well as the pins 24 for anchorage thereto of the draw bars 14, may be provided as sections of a single cross shaft or rod removably inserted through aligned holes in these T-heads and suitably affixed thereto. The rollers 49 may be mounted on such transverse through rod at the time it is assembled through such aligned holes in the T-heads 21. Any suitable means, such as through bolts extending through aligned holes in the T-heads 21 and such unitary transverse rod may secure the latter to the former.

The outer end of the draft control bar 13 may be suitably anchored to the mid-section 48 of transverse shaft 36 (see FIG. 2), such as by providing its end 65 in the form of a hook, as is illustrated in FIG. 5. Such a hook may be provided with a suitable catch or pivoted clip of conventional construction temporarily to block the hook slot, as is diagrammatically indicated in dotted lines at 6 in FIG. 5, or this rear end of the draft control bar may be simply provided with a through hole through which is extended the shaft 36 when the bolts 37 are removed to permit the withdrawal of the shaft free end from out of one of the T-head sleeves 28 and the adjacent roller 46 for insertion of the shaft end exposed at the mid-section. The upright pins or shafts 22 of the T-heads 21, which suspend the latter from the bottom ends of the telescopic sleeves 25, also are preferably provided with freely rotatable rollers 67 for a purpose to be indicated later.

As will be best understood from FIGS. 1 and 3 the sub-assembly of frame members 16 embodied in the implement hitch frame 11 includes with cross bar 19 a pair of upwardly-extending oblique frame legs 80 having their lower ends suitably fixed at 81 to the cross bar 19 (such as by welding) and their top ends connected togethed by a tie bolt 82 between a pair of head plates 83. The draft tongue 17, which is connected to the cross bar 18 of the implement frame structure, may have its top end anchored in any suitable manner to the head plates 83, such as by attachment to the tie bar 82 or a cross strip 84 mounted thereon, as is shown in FIG. 1. The head plates 83 provide means for anchorage thereto of suitable top hook members 85, such as by means of a transverse tie bolt 86. The ends 87 of the cross bar 19 may be turned down, normal thereto for similar support of bottom hook members 88, such as by bolts 89.

As will be seen from FIGS. 3, 4 and 6 each of the top hook members 85 has a downward sloping elongated nose 90 terminating in a tip 91 which is curved laterally outward, so that the tips thereof are flared outward relative to each other, as will be seen from FIG. 3. The top edge of each of the flared and forwardly-extending hook members 85 slopes upwardly from its tip 91 and is provided with an open-top notch 92 intermediate the ends thereof. Thus, the upwardly sloping top edge has a tip section 93 extending back to the notch 92 and a root section 94 extending back from the notch to an anchoring base section 95 of the hook member. It will be seen from FIGS. 3 and 4 that the root section 94 of the top edge of each hook member 85 is obliquely sloped upwardly and emerges with the rear side of notch 92 at a point lower than the meeting of the tip section 93 of this top edge with the front side of this notch, so that the back end of the latter at 96 is higher than the upwardly sloping edge root section 94. The base section 95 of each top hook member 85 carries integral therewith an upright stop post 97 which supports a forwardly-extending elongated finger 98 to serve as a guide and a guard limiting elevation of a hook-anchoring member which is guided up the top edge surface of the nose 90 of the hook member located therebelow.

The lower hook members 88 may be substantial duplicates of the top hook members 85 and mounted in inverted positions to the depending end flanges 87 of the cross bar 19. Thus, each lower hook member 88 has an upwardly-extending and tapered nose 190 terminating in a tip 191 and having a downwardly sloping or oblique bottom edge provided with a tip section 193 and a sloped root section 194 intervened by notch 192, with the latter preceded by projection 196. When the lower hook members 88 are so mounted in the inverted positions by their base sections 195 to the depending end flanges 87 of the cross bar 19 the noses 190 thereof are curved inwardly so that the tips 191 are directed toward each other. In such inverted positions of the lower hook members 88 the integral stop posts 197 depend and extend downwardly to carry therebeneath forwardly extending guide and guard fingers 198.

The pair of top hook members 85 and the pair of bottom hook members 88 together constitute hook means carried by the hitch frame 11 and extending forwardly therefrom. The pair of top rollers 46 and the pair of bottom rollers 49 constitute hook-anchoring means for engagement by these hook members 85 and 88, and are respectively to be engaged in the notches 92 of the top hook members and 192 of the bottom hook members respectively.

It will be understood that if the structure of the implement hitch frame 16 shown in FIG. 3 is located behind the tractor hitch frame 10 of FIG. 2 with the top and bottom hook members 85 and 88 of the former extending forward toward the latter, the noses 90 of the top hook members 85 will engage beneath the rollers 46, and the noses 190 of the bottom hook members 88 will engage above the rollers 49, assuming that there is rather close alignment of the front to back axes of these frame structures. Then, when the tractor is backed up to push the tractor hitch frame 10 back toward the implement hitch frame 11 or its sub-assembly of relatively fixed frame members 16, the bottom rollers 49 will be caused to roll beneath the downwardly sloping bottom edges 193 of the bottom hook members 88. Simultaneously, the top rollers 46 will roll up the upwardly sloping top edges 93 of the top hook members 85. This will ultimately cause the T-head sleeves 28 and the depending rods 27 thereof, which are telescoped into the post sleeves 25, to rise against the downward biasing of the springs 42, until the top rollers 46 pass over the hook projections 96 and the bottom rollers 49 pass beneath the hook projections 196. Then the top rollers 46 will drop into the top hook notches 92 and the bottom rollers 49 will be raised by the biasing to engage in the bottom hook notches 192, to effect the automatic engagement of the implement hitch frame 11 to the tractor hitch frame 10 illustrated in FIG. 6.

Let it be assumed that due to variation in ground surface contour the front to back axis of the implement hitch frame 11 and the tractor hitch frame 10 are appreciably misaligned, such, for example as will be the case when the front end of the implement is tilted downwardly. The tractor operator can easily bring about the automatic attachment of the implement hitch frame 11 to the tractor hitch frame 10, as he backs the tractor, simply by manipulating the hydraulic lift linkage to lower the draw bars 14 so that they will carry the bottom rollers 49 to beneath the tips 191 of the lower hook members 88. At the same time he may make certain that the tips 91 of the hook noses 90 of the top hook members 85 will engage beneath the top rollers 46 by elevating the latter with the use of the hand lever 54. He may grasp the handle 57 and depress the front end 56 of the hand lever 54 so as to cause the pull links 59, respectively pivotally connected between the lever back end 153 and crank arm 53 and the T-head sleeves 28, to lift the latter, such as to the position indicated in FIG. 4. As the tractor is backed up with the tractor hitch frame 10 approaching the implement hitch frame 11 the latter is thus caused to swing upwardly from the initial dot-dash position indicated in FIG. 4 to the full line position therein shown. The rollers 49 will then move back along the lower downwardly sloping edges 193 of the bottom hook members 88 and the top rollers 46 will roll up the upwardly sloping edges 93 of the top hook members 85, eventually respectively to engage within the hook notches 192 and 92. The bottom guard fingers 198 will eventually extend to beneath the bottom rollers 49 to limit the upward tilting of the implement hitch frame 11, and the top guard fingers 98 will serve as similar guides with respect to the top hook members 85 as the rollers 46 travel up their top edge surfaces.

After the tractor operator has, by depression of the front end 56 of the hand lever 54, assured that the tips 91 and 191 of the upper and lower hook members 85 and 88 are properly located between the bottom rollers 49 and the top rollers 46 he may release the handle 57 to permit the biasing springs 42 to snug these rollers to the riding bottom and top edges of the lower and upper hook members. With continued backing of the tractor its hitch frame 10 may be carried back beyond the points where the top rollers 46 will drop into the notches 92 and the bottom rollers 49 will rise up into the bottom notches 192, i.e., to roll up over the sloping root edges 94 and 194 of the upper and lower hook members until abutted against the upright and depending stop arms 97 and 197. Then as the operator reverses the tractor to move it forward the top rollers 46 will glide down the downwardly sloping edges 94 of the upper hook members 85 to engage into the notches 92, and simultaneously the bottom rollers 49 will roll up the upwardly sloping edges 194 to engage up into the notches 192 of the lower hook members for secure automatic attachment of the implement to the tractor. The spring biasing of the top rollers 46 toward the bottom rollers 49, effected by the tension springs 42, will assure maintenance of the engagement of these rollers with the respective riding edges of these upper and lower hook members 85 and 88 to assure attainment of such interengagement.

It is to be noted that the back run sloping edges 94 and 194 and the upright and depending stop arms or posts 97 and 197 are important to the automatic engagement of the hook-anchoring rollers 46 and 49 in the hook notches 92 and 192 respectively, both in cases of substantial alignment of front to back axes of the implement and tractor when on substantially level ground surfaces, as well as when the implement is listed or laterally tilted with respect to the tractor on uneven ground. Such features supplement the action of the upwardly sloping top edges of the upper hook members 85 and the downwardly sloping bottom edges of the lower hook members 88 with respect to the rolling engagements thereof by the rollers 46 and 49, making more certain proper alignment of parts and ultimate engagement of these rollers respectively in the hook notches 92 and 192. These eliminate the necessity for extremely careful backing action of the tractor, the operator merely being required to continue the tractor backing action until rollers 46 and 49 have passed beyond the hook abutments 96 and 196, through or across the hook notches 92 and 192 and up the sloping back run edges 94 and 194 to abutment of the upright and depending stop arms or posts 97 and 197. If the operator does not instantly stop the tractor, but it continues to back up for a short period after such engagement the implement will merely be pushed back with it until the tractor comes to a stop. Then, when the operator reverses the tractor and drives it forward the top rollers 46 and the bottom rollers 46 respectively glide forward and down the sloping back run edges 94 and 194 to permit them finally to drop or engage into the hook notches 92 and 192.

It will also be noted that in many cases of hitching the tractor to an implement with the hitch apparatus of the present invention the forwardly downward slope of the upper hook member noses 90 to their tips 91 and the reverse upward slope of the lower hook member noses 190 to their tips 191 will in most cases assure insertion of these hook noses into the tractor hitch frame 10 between the upper hook-engaging rollers 46 and the lower hook-engaging rollers 49, without requiring manipulation or depression of the hand lever 54 other than to unlock its latch. The spring-biasing afforded by the tension springs 42 will automatically accommodate the necessary vertical spreading of these upper and lower hook-engaging rollers 46 and 49 as the tractor is backed up, to rotate these rollers along the top edges of the upper hook members 85 and the bottom edges of the lower hook members 88 to attain the engaging action previously described. Lift of the top hook-engaging rollers 46 relative to the bottom hook-engaging rollers 49 against the spring biasing by appreciable depression of the front end 56 of the lever 54 initially makes certain that there is sufficient space to assure insertion of the hook nose tips 91 and 191 in the space between these two sets of upper and lower rollers, particularly in cases of appreciable misalignment of the tractor and implement on unusually rough or uneven terrain.

For example, the initial lift of top hook-engaging rollers 46 relative to the bottom hook-engaging rollers 49 by depression of the front end 56 of the hand lever 54 is particularly helpful in cases where there may be appreciable list or lateral tilt of the implement relative to the tractor due to uneven terrain on which they are stopped. Let it be assumed that one views the tractor and the implement from the right side, as in FIG. 1, and that the tractor is either tilted laterally away from the observer relative to the implement or the latter is tilted toward the observer relative to the tractor, in either case disposing the far upper and lower hook members 85 and 88 higher relative to the top and bottom hook-anchoring rollers 46 and 49 on the far side than are the upper and lower hook members 85 and 88 with respect to the top and bottom hook anchoring rollers 46 and 49 on the near side. In such case lift of the top hook-engaging rollers 46 by depression of the front end 56 of the hand lever 54 will assure that all of the hook member nose tips 91 and 191 will be inserted between the top hook-engaging rollers 46 and the bottom hook-engaging rollers 49, to allow the subsequent automatic attachment by backing up the tractor relative to the implement. As the latter action is accomplished the far top roller 46 will engage over the upwardly sloping top edge of the nose 90 of the far hook member 85 and the near bottom roller 49 will engage beneath the bottom edge of the nose 190 of the near bottom hook member 88 first. The spring biasing will then tend to cause the implement to tilt laterally back away from the observer as the tractor is backed up, ultimately to cause also the near top roller 46 to engage the top edge of the nose 90 of the near upper hook member 85 and the far bottom roller 49 to effect like engagement of the bottom edge of the nose 190 of the far lower hook member 88 thereat, thereafter to assure proper engagement of parts for ultimate secure attachment of the tractor hitch frame 10 to the implement hitch frame 11 in correct alignment.

Secure attachment of the complementary hitch frames 10 and 11 for maintenance of the draft connection of the implement to the tractor during working is assured by lift applied by the operator to the lever handle 57. While gravity biasing of the parts of the toggle brace structures including pull links 59, crank arm 53 and the depending inner end 153 of the lever 54 may effect the necessary forward swing thereof to their locked positions such locking can be assured by this handle lift.

Attention is called to the fact that the upright pair of posts 20 carry on their bottom ends upwardly-extending sleeve rollers 67 to provide inside lateral camming surfaces. These rollers 67 are spaced apart transversely a distance appreciably greater than the tips 191 of the lower roller noses 190, since these nose tips are curved inwardly toward each other as will be seen from FIGS. 1 and 3. In cases of appreciable lateral offset of the front end of the implement and its hitch frame 11 with respect to the back end of the tractor and its hitch frame 10 there will be assurance that the nose tips 191 of the lower hook members 88 will be inserted inbetween the upright post rollers 67 upon back-up of the tractor. In such lateral offset the outer curved side face of one of the lower hook members 88 will first engage the adjacent upright post roller 67, and as the latter is rolled therealong it will cam the implement frame 11 over sideways relative to the backing tractor hitch frame 10 to correct this offset and ultimately bring about substantial alignment of the front to back axes of the implement and tractor, so as to assure proper engagement of parts of the hitch. Incidentally, the showing in FIG. 3 has been exaggerated with respect to the spread or flare of the noses 91 of the upper hook members 85 in order to facilitate an understanding of the structures thereof as viewed therein. In practice the lateral spacing between the flared nose tips 91 of the upper hook-engaging members 85 may be about equal to the lateral spacing of the nose tips 191 of the lower hook members 88, i.e., the nose tips 91 may be disposed substantially in vertical planes struck through the nose tips 191; and this will assure that the nose tips 91 will be inserted between the upright posts 20 as the nose tips 191 are inserted between the upright post rollers 67.

Incidentally, the outward flaring of the upper hook members 85 will permit the inner curved side surfaces of their noses 90 to serve as cams relative to the annular flanges 47 on the inner ends of the top hook-anchoring rollers 46. The resulting centring action attained by this camming structure of the top hook members 85 relatively to the top hook-engaging rollers 46 supplements the centering action of the camming structure afforded by the curved outside surfaces of the lower hook members 88 with respect to the upright post sleeve rollers 67. Thus, ultimately it is assured that the implement hitch frame 11 will be properly centered with respect to the tractor hitch frame 10 that will be attained in the final automatic anchoring attachment thereof.

When it is desired to detach the implement from the tractor the complementary hitch frames 10 and 11 can be disconnected readily in the following manner. The operator presses down upon the lever handle 57 to unlock the toggle brace structure by rearward swing of the pivot pins 58 and then to apply lift to the cross shaft 36 by means of the pull links 59 with upward swing of the crank arm 53 and lever lower end 153. The upper hook-engaging rollers 46 are consequently raised up from engagement of the top hook members 90 to contact of the top guard fingers 98. When this contact is achieved continued depression of the lever handle 57 causes the frame sub-assembly 12 to lower the bottom hook-engaging rollers 49 from engagement with the bottom hook members 190 to contact the bottom guard fingers 198. Thus, with the top and bottom hook members 90 and 190 freed from engagement of the top and bottom rollers 46 and 49, the operator may drive the tractor forward so that these rollers respectively roll forward along the bottom edges of the top guard fingers 98 and the top edges of the bottom guard fingers 198 to complete separation of the hitch frames 10 and 11.

It is to be understood that the tractor hitch apparatus of the present invention is not limited to the use of tensioning springs for biasing the top hook-anchoring rollers 46 toward the bottom hook-anchoring rollers 49, as is proposed by the use of the tensioning springs 42 in the embodiment illustrated in FIGS. 1 to 6 inclusive. The same effect may be attained by the use of compression springs, such as in the manner illustrated in FIG. 7. As therein proposed each telescopic sleeve 125 which forms the top section of one of the upright posts, such as 20, may slidably receive therein telescopic rod 127 which supports one of the transversely extending T-head sleeves 28, with this rod being of an O.D. appreciably less than the I.D. of the sleeve. On a lower portion of the slidable rod 127 may be provided an annular rib or flange 100 to form an abutment slidably disposed in the bore 101 of the sleeve 125. Above the annular flange 100 a compression helical spring 102 is mounted to be disposed in the annular space 103 between the rod and the sleeve bore 101. The top end of the compression spring 102 may be abutted against a ring 104 fixed in the top end of the sleeve 125. Thus, when the rod 127 is moved axially out of or lifted relative to the sleeve bore 101 the compression spring 102 will apply inward or downward biasing force to the rod relative to the sleeve, just as in the case of the use of the tension springs 42.

It is also to be understood that the use of the tractor hitch apparatus illustrated in the drawings and described above is not limited to attachment of the hitch frame 10 to the tractor and the implement frame 11 to the implement. The positions thereof may be reversed, so that the hitch frame 11 is carried by the tractor hitch linkage or draw bars 14 and draft control bar 13. In such a reversal of parts the lift lever 54, the crank arm 53 and pull links 59 may be omitted. This may require a more careful preliminary alignment of the back end of the tractor relative to the implement to assure proper automatic engagement of parts, but such hitch apparatus would effectively operate under many conditions of use. Further, in so reversing the hitch frames 10 and 11 the lift mechanism comprising lever 54 and its lower crank arm section 153, crank arm 53 and the pair of pull links 59, may be utilized even though this hitch frame 10 is now mounted upon the front end of the implement. In the latter case simple means which would readily occur to one may be employed for remotely operating such lever structure. For example, the free end 56 of the lever 54 may extend upright and a pull cable attached to its top end may extend to the vicinity of the tractor seat, for pull to be applied thereto to effect the same operation of this lift mechanism. Such a reversal of parts will, of course, locate the hook members on the tractor hitch frame and the hook-engaging members and the telescopic upright posts on the implement hitch frame; and their cooperative actions and functions will be the same as those described above.

While the illustrated embodiment proposes the mounting of one of the hitch frames, such as the sub-assembly of frame members 12 of frame 10, of the top and bottom hook-anchoring means or rollers 46 and 49 by support thereof on the spring-biased upper and lower sections of the telescopic posts 20 embodied in this hitch frame, with the opposed and complementary top and bottom hook members 85 and 88 being mounted at vertically spaced relatively fixed points on the complementary hitch frame 11, it is to be understood that these locations of such parts may be reversed in a practical embodiment of the present tractor hitch apparatus. In other words, the upper sections, or depending rods 27 and associated structure, of the telescopic posts 20 may carry the top hook members 85 and the lower post sections, or upright sleeves 25 and associated structure, may carry the bottom hook members 88, with the complementary hook-anchoring means or rollers 46 and 49 being carried at relatively fixed vertically spaced points by the sub-assembly of frame members 16 of the opposed hitch frame 11. In such a reversal of parts the upper and lower sections of the telescopic posts 20, which will respectively carry the upwardly sloping top hook members 85 and the downwardly sloping bottom hook members 88, will need to be biased apart intially to be gradually forced toward each other or progressively telescoped together against the biasing with the progressive insertion of the floating hook members between the relatively fixed top and bottom hook-anchoring members or rollers 46 and 49. For this purpose such reversed biasing may be readily provided by inserting or dropping elongated helical compression springs down into the upright sleeves 25 before insertion into the top ends of these sleeves of the bottom ends of the telescopic depending rods 27, so that the bottom ends of such compression springs rest upon the top ends of the upright shafts 22 (which block the bottoms of the sleeves) and so that the bottom ends of the depending telescopic rods rest upon the top ends of these springs. Suitable manually operable lever mechanism may be employed initially to depress the hook carrying top sections of the telescopic posts against their upward biasing by such inserted compression springs, for facilitating entry of the noses 90 and 190 of the hooks now embodied in the tractor hitch frame 10 between the hook-anchoring rollers 46 and 49 now embodied in the implement hitch frame 11. For this purpose upright posts may be rigidly carried by T-head sleeves 28, and the back ends of the crank arm 53 and lever section 153 extended to the top ends of these posts and be connected thereto by pins on the upright arms riding in elongated longitudinal slots in these crank arm and lever ends. As a result, if the front end 56 of lever 54 is lifted by pull up on handle 57 the depending rods 27 will be telescoped down into sleeves 25 of the telescopic posts 20. Any suitable unlockable latching means may be employed to advantage with such lift lever.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a tractor hitch apparatus the combination of
   (a) a working tool-supporting sub-assembly attachable to a three-point suspension type of tractor hitch linkage and
   (b) a complementary working-tool connector sub-assembly attachable to a working tool; one of said sub-assemblies comprising
   (c) a frame including a pair of transversely-spaced upright self-adjusting post means each having upper and lower sections slidably connected together for relative foreshortening and lengthening longitudinal movement, and means biasing said upper and lower sections of each of said post means longitudinally relative to each other to tend to effect relative change in the effective length of this post means,
the other of said sub-assemblies comprising
   (d) a complementary upright frame detachably connected to said first-mentioned frame; and
   (e) complementary and opposed, interengaged automatically connectable means on said frames comprising
   (f) hook means mounted on and projecting from upper and lower portions of one of said frames toward the other frame, and
   (g) transversely extending hook - anchoring means mounted on upper and lower portions of the other of said frames,
the automatically connectable means on said frame which includes said pair of upright self-adjusting post means being mounted to the upper and lower sections of the latter for relatively vertical motion in one direction due to the biasing and in the opposite direction by engagement of the complementary automatically connectable means in opposition to the biasing, whereby when said frames are pushed together in opposed relation said hook means are snapped about said hook-anchoring means.

2. The tractor hitch apparatus as defined in claim 1 in which
   (h) manually operable means are provided to move said upper sections of said post means longitudinally relative to said lower sections thereof against the biasing for disengaging said hook means from said hook-anchoring means to detach said frames from each other.

3. The tractor hitch apparatus as defined in claim 2 in which said manually operable means is a hand lever pivotally mounted at a fulcrum point on the frame of said tool-supporting sub-assembly, and
   (i) freeable locked latching means temporarily preventing relative longitudinal motion of said upper and lower sections of said post means until said latching means is freed.

4. The tractor hitch apparatus as defined in claim 3 in which said hand lever and latching means are combined to provide an over-center toggle brace comprising
   (j) a link pivotally mounted at longitudinally spaced points respectively to said lever for there forming a knee and to said upper post means sections with said link connecting said lever to the latter, and
   (k) locking stop means limiting swing of the knee through a line extending between the lever fulcrum point and the pivotal connection of said link with upper post means sections to a locking point beyond this line.

5. The tractor hitch apparatus as defined in claim 1 in which said hook-anchoring means is carried by said upper and lower, relatively movable sections of said upright self-adjusting post means of one of said frames with said hook means being carried at relatively fixed points on said other opposed complementary frame.

6. The tractor hitch apparatus as defined in claim 5 in which said frame which is attachable to said tractor hitch linkage includes said self-adjusting post means that carry said hook-anchoring means, with said complementary frame that carries said hook means being attachable to a working tool.

7. In a tractor hitch apparatus the combination of
   (a) a working tool-supporting sub-assembly attachable to a three-point suspension type of tractor hitch linkage and
   (b) a complementary working-tool connector sub-assembly attachable to a working tool;
   (c) said sub-assembly which is attachable to said tractor hitch linkage comprising a frame including a pair of transversely-spaced upright self-adjusting post means each having upper and lower sections slidably connected together for relative foreshortening and lengthening longitudinal movement, and means biasing said upper and lower sections of each of said post means longitudinally relative to each other to tend to effect relative change in the effective length of this post means,
   (d) hook-anchoring means mounted on and projecting transversely from said upper and lower sections of said self-adjusting post means, for relative vertical motion in one direction due to the relative biasing of said upper and lower post sections and in the opposite direction by engagement of complementary automatically connectable hook means,
   (e) said sub-assembly which is attachable to a working tool comprising a complementary upright frame, and
   (f) transversely-extending hook means serving as said complementary automatically connectable means and fixedly mounted on upper and lower portions of said complementary working-tool frame detachably engaged by said hook-anchoring means by pushing said frames together.

8. In a tractor hitch apparatus the combination comprising
   (a) an upright tractor hitch frame attachable to a three-point suspension type of tractor hitch linkage including
   (b) a pair of transversely-spaced and upright self-adjusting posts each having upper and lower sections slidably connected together for relative foreshortening and lengthening longitudinal movement,
   (c) spring means biasing said upper and lower sections of each of said posts longitudinally toward each other,
   (d) a pair of transversely-extending top hook-engaging members carried by said upper sections of said posts,
- (e) another pair of transversely-extending bottom hook-engaging members carried by said lower sections of said posts,
- (f) a complementary upright implement frame attachable to the front end of an implement and having vertically-spaced upper and lower sections,
- (g) a pair of forwardly-extending elongated top hook members each having a rear mounting portion fixedly carried by the upper section of said implement frame, a front tip end and a top edge sloping upwardly and back from the latter to its rear mounting portion up which a complementary one of said pair of top hook-engaging members may slide upon back-up of the tractor carrying said tractor hitch frame, each hook member top edge being provided with a notch into which the complementary top hook-engaging member is engaged by drop thereinto as it was slid back along said top edge due to the action of said spring biasing of said upper and lower sections of said posts longitudinally toward each other, and
- (h) another pair of generally similar forwardly-extending elongated bottom hook members fixedly carried in similar manner by the lower section of said implement frame each having a front tip end and a bottom edge sloping downwardly and back from the latter down which a complementary one of said pair of bottom hook-engaging members may slide upon tractor back-up, each bottom hook member bottom edge being provided with a notch into which the complementary bottom hook-engaging member is engaged by lift thereinto as it was slid back along said bottom edge due to the action of said spring biasing of said upper and lower sections of said posts.

9. The tractor hitch apparatus as defined in claim 8 in which is provided
- (i) stop means at the back ends of the sloped and notched top edges of said hook members located rearward of the notches in the latter to limit rearward slide of the complementary hook engaging members back beyond the notches.

10. The tractor hitch apparatus as defined in claim 8 in which
- (j) said two pairs of hook-engaging members are located between said pair of posts,
- (k) means are provided for fixing together said upper sections of said posts and separately fixing together said lower sections thereof for simultaneous raising and lowering said upper post sections relative to said lower post sections,
- (l) one of said pair of hook members being progressively bent inwardly toward each other from their rear mounting portions forward to their tip ends for ready insertion of the latter between said pair of upright posts and to provide said bent hook members with sloped outer sides.

11. The tractor hitch apparatus as defined in claim 10 in which
- (m) the bottom pair of hook members are so bent with their rear mounting portions being transversely spaced apart a short distance less than the transverse spacing of said lower post sections for substantially centered insertion therebetween,
- (n) and upwardly-extending camming surfaces are provided on the inner sides of said lower post sections against which the sloped outer sides of said bottom hook members may slide during hook inserting action to effect automatically relative centering of said frames when pushed together.

12. The tractor hitch apparatus as defined in claim 11 in which
- (o) said transversely-extending pairs of top and bottom hook-engaging members and said upwardly-extending camming surfaces are provided as freely rotatable rollers.

13. The tractor hitch apparatus as defined in claim 8 in which is provided
- (p) manually operable means mounted on said tractor hitch frame to move said upper sections of said posts upward relative to said lower sections thereof against the biasing thereof.

14. The tractor hitch apparatus as defined in claim 13 in which said manually operable means is
- (q) a hand lever pivotally mounted at a fulcrum point on said tractor hitch frame, and
- (r) freeable locked latching means temporarily preventing relative longitudinal motion of said upper and lower sections of said posts until said latching means is freed.

15. The tractor hitch apparatus as defined in claim 14 in which said hand lever and latching means are combined to provide an over-center toggle brace comprising
- (s) a link pivotally mounted at longitudinally-spaced points respectively to said lever for there forming a knee and to said upper post sections with said link connecting said lever to the latter, and
- (t) locking stop means limiting swing of the knee through a line extending between the lever fulcrum point and the pivotal connection between said link and upper post sections to a locking point beyond this line.

References Cited by the Examiner

UNITED STATES PATENTS

| 2,793,880 | 5/57 | Oehler et al. | 280—477 X |
| 2,979,137 | 4/61 | Hess | 280—510 X |
| 3,029,092 | 4/62 | Stuart | 280—477 |
| 3,034,587 | 5/62 | Dorkins et al. | 280—461 X |

FOREIGN PATENTS 875,176 6/42 France.

BENJAMIN HERSH, *Primary Examiner.*

LEO FRIAGLIA, *Examiner.*